(12) United States Patent
Suzuki et al.

(10) Patent No.: US 10,522,858 B2
(45) Date of Patent: Dec. 31, 2019

(54) POWER CONTROL APPARATUS, FUEL CELL SYSTEM, AND METHOD OF CALCULATING AMOUNT OF USED FUEL GAS

(71) Applicant: KYOCERA Corporation, Kyoto-shi, Kyoto (JP)

(72) Inventors: Yuki Suzuki, Yokohama (JP); Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 45 days.

(21) Appl. No.: 15/576,067

(22) PCT Filed: May 26, 2016

(86) PCT No.: PCT/JP2016/002551
§ 371 (c)(1),
(2) Date: Nov. 21, 2017

(87) PCT Pub. No.: WO2016/189872
PCT Pub. Date: Dec. 1, 2016

(65) Prior Publication Data
US 2018/0159153 A1    Jun. 7, 2018

(30) Foreign Application Priority Data

May 27, 2015 (JP) ................................ 2015-107866

(51) Int. Cl.
*H01M 8/06* (2016.01)
*H01M 8/04313* (2016.01)
(Continued)

(52) U.S. Cl.
CPC .......... *H01M 8/04313* (2013.01); *F24H 1/00* (2013.01); *H01M 8/12* (2013.01)

(58) Field of Classification Search
CPC ......... H01M 8/04313; H01M 8/04029; H01M 8/04074; H01M 8/04298; H01M 8/0438;
(Continued)

(56) References Cited

FOREIGN PATENT DOCUMENTS

JP    H02-301969 A    12/1990
JP    2002-8686 A    1/2002
(Continued)

OTHER PUBLICATIONS

International Search Report dated Aug. 16, 2016, issued by Japan Patent Office for International Application No. PCT/JP2016/002551.

(Continued)

*Primary Examiner* — Raymond Alejandro
(74) *Attorney, Agent, or Firm* — Procopio Cory Hargreaves and Savitch LLP

(57) ABSTRACT

A power control apparatus includes a controller configured to control a fuel cell. The fuel cell generates power and heats water using fuel gas. The fuel gas supplies the power and hot water to a plurality of consumer facilities. The controller obtains an amount of the fuel gas used by the fuel cell. The controller obtains an amount of the hot water supplied to the plurality of consumer facilities. The controller calculates, based on the amount of the fuel gas and the amount of the hot water, an amount of the fuel gas used by each one of the plurality of consumer facilities.

6 Claims, 6 Drawing Sheets

(51) Int. Cl.
*F24H 1/00* (2006.01)
*H01M 8/12* (2016.01)

(58) Field of Classification Search
CPC ......... H01M 8/04537; H01M 8/04701; H01M 8/04746; H01M 8/04858; H01M 8/12; F24H 1/00
See application file for complete search history.

(56) References Cited

FOREIGN PATENT DOCUMENTS

| | | | | |
|---|---|---|---|---|
| JP | 2002-367619 A | 12/2002 | | |
| JP | 2004-116857 A | 4/2004 | | |
| JP | 2004-134286 A | 4/2004 | | |
| JP | 2005-310514 | * 11/2005 | ............. | H01M 8/04 |
| JP | 2005-310514 A | 11/2005 | | |
| JP | 2014-211975 A | 11/2014 | | |

OTHER PUBLICATIONS

Written Opinion of the International Searching Authority dated Aug. 16, 2016, issued by Japan Patent Office for International Application No. PCT/JP2016/002551.

* cited by examiner

FIG. 6

| Power generation amount $W_{FC}$ | Power generation efficiency $e_w$ | Amount of power generation gas used for power generation $a_w$ |
|---|---|---|
| $W_{FC1}$ | $e_{w1}$ | $a_{w1}$ |
| ... | ... | ... |
| $W_{FCm}$ | $e_{wm}$ | $a_{wm}$ |

POWER CONTROL APPARATUS, FUEL CELL SYSTEM, AND METHOD OF CALCULATING AMOUNT OF USED FUEL GAS

CROSS REFERENCE TO RELATED APPLICATION

This application claims priority to and the benefit of Japanese Patent Application No. 2015-107866 (filed on May 27, 2015), the entire contents of which are incorporated herein by reference.

TECHNICAL FIELD

The disclosure relates to a power control apparatus, a fuel cell system, and a method of calculating an amount of a used fuel gas.

BACKGROUND

There is conventionally known a configuration in which power and heat are generated by a fuel cell using a fuel gas and hot water obtained by heating tap water with the heat is stored in a hot water tank to be supplied to a bath and so on (e.g., see patent literature PLT 1 set forth below). For example, to fairly allocate, to each unit of an apartment, cost burden of the fuel gas used by the fuel cell installed in an apartment, it is necessary to separate an amount of the fuel gas used by the fuel cell into an amount used for power generation and an amount used for water heating.

SUMMARY

A power control apparatus according to one embodiment of the disclosure includes a controller configured to control a fuel cell. The fuel cell generates power and heats water by using a fuel gas. The fuel cell supplies the power and hot water to a plurality of consumer facilities. The controller obtains an amount of the fuel gas used by the fuel cell. The controller obtains an amount of the hot water supplied to the plurality of consumer facilities. The controller calculates, based on the amount of the fuel gas and the amount of the hot water, an amount of the fuel gas used by each one of the plurality of consumer facilities.

A fuel cell system according to one embodiment of the disclosure includes a fuel cell. The fuel cell generates power and heats water by using a fuel gas. The fuel cell supplies the power and hot water to a plurality of consumer facilities. The fuel cell system also includes a power control apparatus having a controller. The controller controls the fuel cell. The controller obtains an amount of the fuel gas used by the fuel cell. The controller obtains an amount of the hot water supplied to the plurality of consumer facilities. The controller calculates, based on the amount of the fuel gas and the amount of the hot water, an amount of the fuel gas used by each one of the plurality of consumer facilities.

A method of calculating an amount of a used fuel gas according to one embodiment of the disclosure includes obtaining an amount of a fuel gas used by a fuel cell. The fuel cell generates power and heats water by using the fuel gas. The fuel cell supplies the power and hot water to a plurality of consumer facilities. The method of calculating the amount of the used fuel gas includes obtaining an amount of the hot water supplied to the plurality of consumer facilities. The method of calculating the amount of the used fuel gas includes calculating, based on the amount of the fuel gas and the amount of the hot water, an amount of the fuel gas used by each one of the plurality of the consumer facilities.

BRIEF DESCRIPTION OF THE DRAWINGS

In the accompanying drawings:

FIG. 6 is an example of a table indicating a relation between the amount of the power generated by the fuel cell and power generation efficiency.

DETAILED DESCRIPTION

A fuel cell generates power and heats water simultaneously. However, the fuel cell cannot directly measure an amount of a fuel gas used for power generation and an amount of the fuel gas used to heat water. For a system having the fuel cell installed in an apartment and configured to supply the power and the hot water to each unit, it is not easy to calculate a gas rate based on an amount of power and an amount of hot water used by each unit. The apartment used herein means a small- or medium-sized apartment having, for example, 10 or less units. Each unit of the apartment uses different amounts of the gas, power, and water. To fairly allocate cost burden of the fuel gas used by the fuel cell to each unit, it is necessary to separate the amount of the fuel gas used by the fuel cell into an amount used for power generation and an amount used for water heating.

A method of calculating an amount of a used fuel gas, a fuel cell system, and a power control apparatus according to the disclosure are capable of achieving fair allocation of the cost burden by separating the amount of the fuel gas used by the fuel cell into the amount used for power generation and the amount used for water heating. Hereinafter, the method of calculating the amount of the used fuel gas, the fuel cell system, and the power control apparatus according to the disclosure will be described in detail with reference to the accompanying drawings.

First Embodiment

Figure 1:
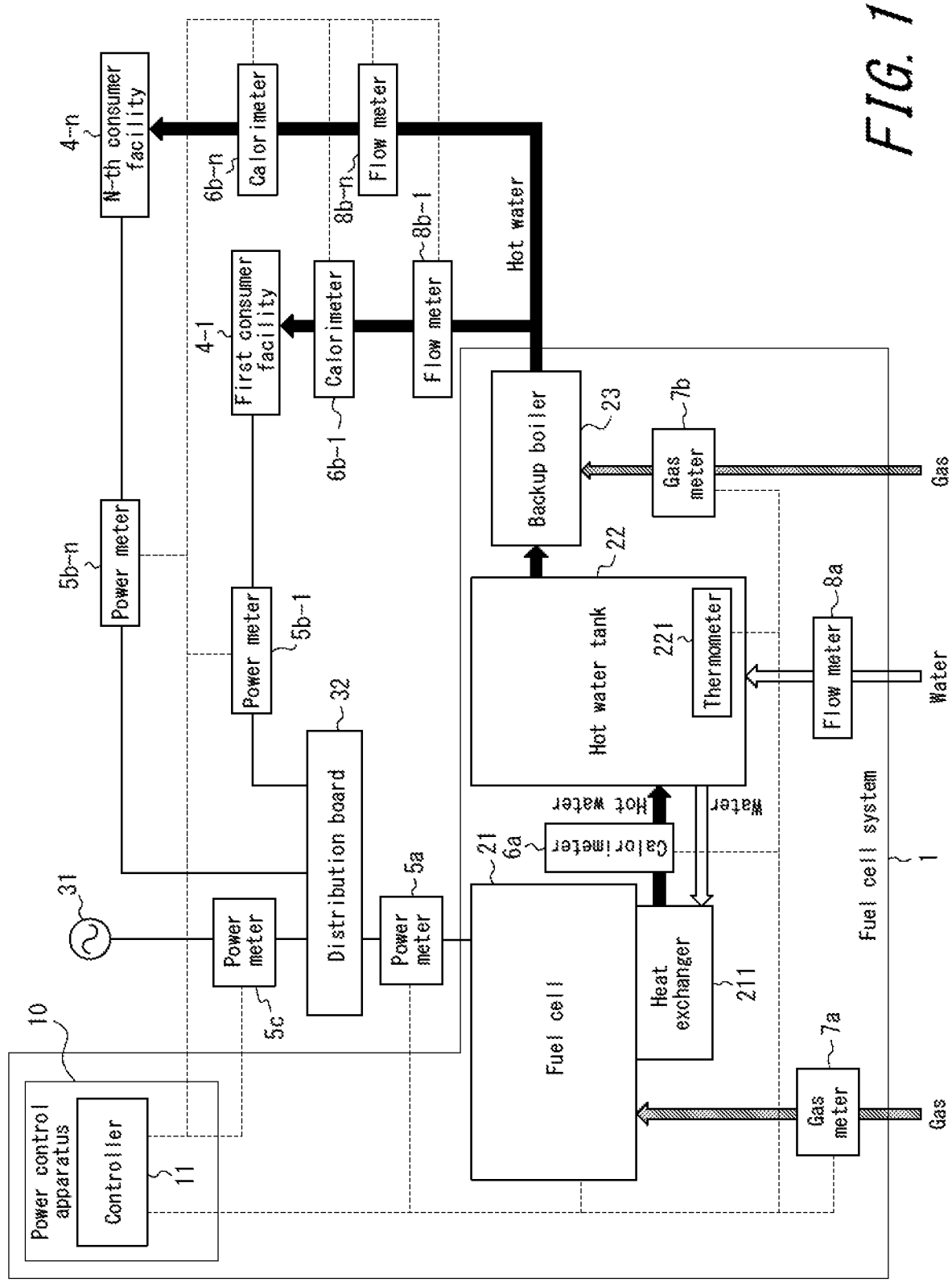
FIG. 1 is a block diagram of a fuel cell system according to a first embodiment.

As illustrated in FIG. 1, a fuel cell system 1 includes a power control apparatus 10, a fuel cell 21, a hot water tank 22, and a backup boiler 23.

The fuel cell system 1 is coupled to a plurality of consumer facilities 4 through power lines and hot water pipes. The fuel cell system 1 supplies, to the plurality of consumer facilities 4, power generated by the fuel cell 21 and hot water heated by the fuel cell 21 and stored in the hot water tank 22. The plurality of consumer facilities 4 includes a first consumer facility 4-1 to an n-th consumer facility 4-$n$ (n is a natural number of 2 or greater). The consumer facilities 4 are, for example, units of an apartment. However, the consumer facilities 4 are not limited thereto but may be a house or a two-household house. Consumers owning the consumer facilities 4-1 to **4-*n*, respectively, may each sign a contract with an administrator of the fuel cell system 1 and bear running cost of the fuel cell system 1 according to the contract. Note that "the consumer facilities 4" is used when there is no need to specify the consumer facilities 4-1 to 4-*n*. The consumers owning the consumer facilities 4-1 to 4-*n*, respectively, will be referred to as units of the consumer facilities 4**, or simply as units.

In FIG. 1, solid lines connecting between the fuel cell system 1 and the consumer facilities 4 represent the power lines used for power supply. The fuel cell system 1 and the consumer facilities 4 are coupled to one another through the power lines via the distribution board 32, such that the consumer facilities 4 may receive power supply from the fuel cell system 1. A commercial power grid 31 is also coupled to the distribution board 32 such that the consumer facilities 4 may receive power supply from the commercial power grid 31 as well. The commercial power grid 31 is also referred to as a power network. Power meters 5 (**5*a*, 5*b*-1 to 5*b*-*n*, and 5*c*) are connected midway of the power lines. The power meters 5** may measure an amount of the power flowing through the power lines.

In FIG. 1, white arrows represent cold water pipes, and black arrows represent hot water pipes. Hatched arrows represent pipes for the fuel gas (hereinafter, also referred to simply as a gas). Flow meters 8 (**8*a*, 8*b*-1 to 8*b*-*n*) and calorimeters 6 (6*a*, 6*b*-1 to 6*b*-*n*) are connected midway of the cold water pipes and the hot water pipes. The gas meters 7 (7*a* and 7*b*) are connected midway of the gas pipes. To the consumer facilities 4**, pipes to directly supply water and the gas may be connected.

In FIG. 1, broken lines connecting between the controller 11 of the power control apparatus 10, the fuel cell 21, the power meters 5, the calorimeters 6, the gas meters 7, and the flow meters 8 represent communication lines. The controller 11 obtains data from each measurement instrument through the communication line. The controller 11 controls the fuel cell 21 through the communication line. The controller 11, based on data obtained from each measurement instrument and a result of control of the fuel cell 21, calculates an amount of the fuel gas used in the fuel cell system 1. Data communication through the communication lines may be either wired communication or wireless communication. The power control apparatus 10 may be coupled to each measurement instrument via a network. The controller 11 may be CPU, a processor, or the like.

The fuel cell 21 generates power by using the fuel gas supplied thereto and also generates heat. According to the present embodiment, the fuel cell 21 is, but not limited to, Solid Oxide Fuel Cell (SOFC). The fuel cell 21 may be Polymer Electrolyte Fuel Cell (PEFC), Phosphoric Acid Fuel Cell (PAFC), or the like.

The fuel cell 21, by using a reformer or the like, reforms a fuel gas supplied from an external source into a fuel gas having high hydrogen content. The fuel cell 21 causes a reaction between oxygen in the air supplied from an outside and hydrogen in the fuel gas and thus generates power, thermal energy, and steam. The thermal energy is used by a heat exchanger 211 described later to heat water. The steam is simply turned into hot water by a condenser. That is, the fuel cell 21 generates power and heats water simultaneously. The fuel gas is, but not limited to, a city gas or a propane gas. The fuel gas may be a hydrogen gas or the like.

(Hot Water Supply from Fuel Cell System)

The heat exchanger 211 is coupled to the fuel cell 21. Due to heat conductivity existing between the heat exchanger 211 and a heating portion of the fuel cell 21, the heat generated by the fuel cell 21 is transferred. The heat exchanger 211 is coupled to the hot water tank 22 via the water pipes. The heat exchanger 211 heats water sent from the hot water tank 22 indicated by the white allow in FIG. 1 with the heat transferred from the fuel cell 21. The heat exchanger 211 sends heated water represented by the black arrow in FIG. 1 back to the hot water tank 22. The pipe to flow the hot water back to the hot water tank 22 from the heat exchanger 211 may have the calorimeter **6*a* inserted thereto. The calorimeter 6*a* measures a calorific value given to the hot water by the heat exchanger 211**.

The calorimeters 6 measure a flow rate and temperature of fluid flowing therethrough and thus calculate the calorific values of the fluid passing through the calorimeters 6. The calorific values given to the fluid by heat loads coupled to the calorimeters 6 in series are each the product of a difference between temperature of the fluid before entering the heat load and temperature of the fluid flowing out of the heat load and the flow rate of the fluid flowing through the heat load. According to the present embodiment, the heat exchanger 211 serves as the heat load. The calorimeter **6*a* measures temperature of water flown to the heat exchanger 211 from the hot water tank 22 and temperature of water flown back to the hot water tank 22 from the heat exchanger 211. The calorimeter 6*a* measures the flow rate of the hot water flown back to the hot water tank 22 from the heat exchanger 211. The calorimeter 6*a* calculates the product of the difference between the temperature of the water flown to the heat exchanger 211 and the temperature of the hot water flown back from the heat exchanger 211 and the flow rate of the hot water flown back from the heat exchanger 211, and thus calculates the calorific value given to the hot water by the heat exchanger 211. In FIG. 1, the flow meters 8*b* and the calorimeters 6*b* are coupled midway of the pipes for flowing the hot water to the consumer facilities 4 from the fuel cell system 1. The flow meters 8*b* do not need to be coupled to the pipes. The calorimeters 6*b* may have functions of the flow meters 8*b***.

Tap water is poured into the hot water tank 22. The hot water tank 22 supplies water to the heat exchanger 211. The hot water tank 22 stores the hot water flown back from the heat exchanger 211. To the hot water tank 22, hot water obtained through condensation of the steam generated by the fuel cell 21 may be supplied. The hot water tank 22 stores heat generated by the fuel cell 21 in the form of the hot water. The hot water tank 22 may have a stratified heat storage structure. In the stratified heat storage structure, poured tap water is stored in a lower portion of the tank and the hot water is stored in an upper portion of the tank. In this case, a temperature stratification boundary surface is formed between the hot water in the upper portion and the poured tap water in the lower portion, making the hot water and the poured tap water less likely to mix with each other. The hot water tank 22 may have a thermometer 221. The thermometer 221 measures temperature of the hot water or the poured tap water at a predetermined height of the hot water tank 22. When the hot water and the poured tap water are separated from each other in the hot water tank 22, measurement of the temperature at the predetermined height of the hot water tank 22 indicates an amount of the hot water stored in the hot water tank 22. The pipe for pouring the tap water to the hot water tank 22 may have a flow meter **8*a*. The flow meter 8*a* measures an amount of the tap water poured into the hot water tank 22**.

The backup boiler 23 is coupled to the pipe for supplying the hot water to the consumer facilities 4 from the hot water tank 22. The backup boiler 23 heats water by burning the gas when the hot water is supplied to the consumer facilities 4 from the hot water tank 22. Normally, the hot water is supplied to the consumer facilities 4 within an amount thereof stored in the hot water tank 22. When the amount of the hot water stored in the hot water tank 22 exceeds an amount of the hot water required by the consumer facilities 4, the backup boiler 23 does not heat the water. When the amount of the hot water stored in the hot water tank 22 is less than the amount of the hot water required by the consumer facilities 4, the backup boiler 23 reheats the water to secure the amount of the hot water required by the consumer facilities 4.

The pipes for supplying the hot water to the consumer facilities 4-1 to 4-n from the hot water tank 22 have flow meters 8b-1 to 8b-n (the flow meters 8b), respectively. The flow meters 8b measure amounts of the hot water supplied to the units of the consumer facilities 4. These pipes may have the calorimeters 6b-1 to 6b-n (the calorimeters 6b), respectively. The calorimeters 6b measure calorific values of the hot water supplied to the consumer facilities 4.

The hot water supplied to the consumer facilities 4 from the hot water tank 22 is at predetermined temperature. The predetermined temperature is, for example, 90° C. or 60° C. Upon receiving the hot water at the predetermined temperature, the consumer facilities 4 mix the hot water with the water to cool down the hot water to temperature suitable for use. The temperature suitable for use is, for example, 40° C. Hereinafter, the amount of the hot water supplied to the consumer facilities 4 represents the amount of the hot water at the predetermined temperature.

(Power Supply from Fuel Cell System)

The fuel cell 21 is coupled to the distribution board 32 via the power meter 5a. To the distribution board 32, the commercial power grid 31 is coupled via the power meter 5c. The distribution board 32 is coupled to the consumer facilities 4. The power meters 5b-1 to 5b-n are coupled midway between the distribution board 32 and the consumer facilities 4-1 to 4-n, respectively.

The power generated by the fuel cell 21 or the power from the commercial power grid 31 (hereinafter, also referred to as grid power) is supplied to power loads of the consumer facilities 4 coupled via the distribution board 32. That is, the consumer facilities 4 may receive power supply from either the fuel cell 21 or the commercial power grid 31.

(Amount of Fuel Gas Used in Fuel Cell System)

As described above, the fuel cell 21 generates power using the fuel gas supplied from the external source and heats the water supplied from an external source. The backup boiler 23, if necessary, heats water by burning the gas when the hot water is supplied to the consumer facilities 4. Therefore, a sum of the amount of the fuel gas used by the fuel cell 21 and the amount of the fuel gas burned by the backup boiler 23 represents the amount of the fuel gas used by the fuel cell system 1.

A gas rate for the amount of the fuel gas used in the fuel cell system 1 is borne by the units of the consumer facilities 4 supplied with the power and the hot water from the fuel cell system 1. Each unit of the consumer facilities 4 consumes a different amount of power and a different amount of hot water. Therefore, the amount of the fuel gas corresponding to each unit should be calculated based on the amount of power and the amount of hot water consumed by each unit so as to calculate the gas rate to be borne by each unit.

(Calculation of Amounts of Fuel Gas Used by Consumer Facilities)

Figure 2:
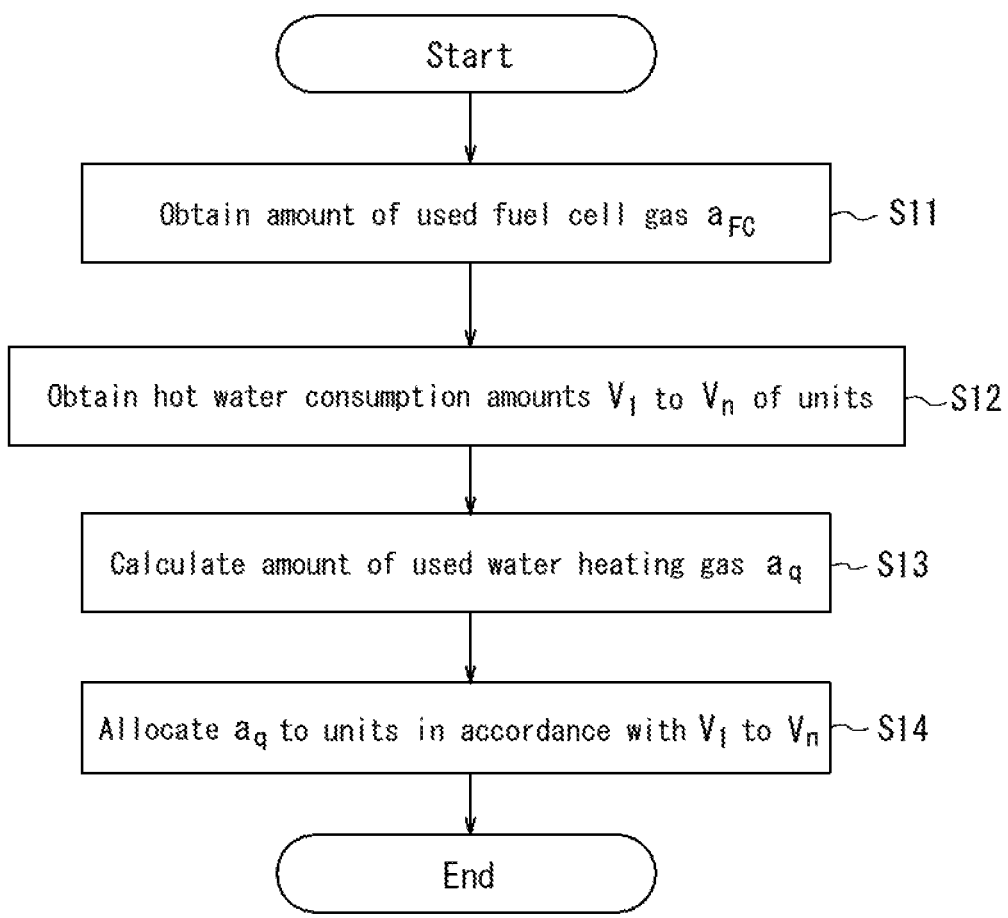
FIG. 2 is a flowchart illustrating a method of calculating an amount of a used fuel gas.

According to the present embodiment, the controller 11 of the power control apparatus 10 controls the fuel cell 21 and calculates the amounts of the fuel gas used by the consumer facilities 4. The following is a method of calculating the amount of the fuel gas according to the present embodiment described with reference to FIG. 2. First, the controller 11 of the power control apparatus 10 obtains an amount of used fuel cell gas $a_{FC}$ representing an amount of the fuel gas used by the fuel cell 21, from the gas meter 7a (step S11).

Subsequently, the controller 11 obtains, from the flow meters 8b, amounts of hot water (hereinafter, also referred to as hot water consumption amounts) $V_1$ to $V_n$ supplied to the units of the consumer facilities 4 (the consumer facilities 4-1 to 4-n) from the fuel cell system 1 and consumed by the units (step S12).

Next, the controller 11, based on the amount of used fuel cell gas $a_{FC}$, calculates an amount of the gas (hereinafter, also referred to as an amount of used water heating gas $a_q$) corresponding to the calorific value used by the fuel cell 21 to heat the water (step S13). At step S13, the amount of used fuel cell gas $a_{FC}$ is separated into the amount of used water heating gas $a_q$ and the amount of the gas used by the fuel cell 12 for power generation (hereinafter, also referred to as an amount of a power generation gas used for power generation of the fuel cell $a_w$).

At step S13, for example, the amount of the power generation gas used for power generation may be calculated without distinguishing between the power generated by the fuel cell 21 and the grid power and then separated into the amount of used water heating gas and the amount of the power generation gas used for power generation. The controller 11 may obtain the amount of the power generated by the fuel cell 21 (hereinafter, also referred to as a fuel cell power generation amount $W_{FC}$) from the power meter 5a of FIG. 1 and consider an electricity bill, calculated based on the fuel cell power generation amount $W_{FC}$ and a unit price of the grid power, as power generation cost. The controller 11 may calculate, as the amount of the power generation gas used for power generation $a_w$, an amount of the gas equivalent to the gas rate corresponding to the power generation cost. The controller 11 may calculate the amount of used water heating gas $a_q$ by reducing the amount of the power generation gas used for power generation $a_w$ from the amount of used fuel cell gas $a_{FC}$. The controller 11 may calculate water heating cost by reducing the power generation cost from the gas rate corresponding to the amount of used fuel cell gas.

At step S13, the controller 11 may otherwise calculate the amount of used water heating gas $a_q$. For example, the controller 11 may calculate the amount of used water heating gas $a_q$ by multiplying the amount of used fuel cell gas $a_{FC}$ by a predetermined coefficient.

Then, the controller 11 allocates, to each unit of the consumer facilities 4, the amount of used water heating gas $a_q$ based on the amount of the hot water consumed by each unit (step S14). For example, the controller 11 may allocate the amount of used water heating gas $a_q$ in accordance with ratios of the hot water consumption amounts $V_1$ to $V_n$ of the units. Each unit of the consumer facilities 4 bears the gas rate corresponding to the amount of used water heating gas $a_q$ allocated thereto.

When the backup boiler 23 reheats the water to supply hot water to the units of the consumer facilities 4, the controller 11 also allocates an amount of the gas used by the backup boiler 23 (hereinafter, also referred to as an amount of used backup boiler gas $a_{BB}$) to the units. Water rates for the hot water supplied to the units of the consumer facilities 4 are calculated as the water rates on the basis of volumes corresponding to the hot water consumption amounts $V_1$ to $V_n$ of the units.

An electricity bill of each unit of the consumer facilities 4 are calculated based on the amount of the power consumed by each unit. The controller 11 may calculate the electricity bill by separating the power supplied to each unit of the consumer facilities 4 into the power generated by the fuel cell 21 and the grid power. The controller 11 may calculate the electricity bill by considering the entire amount of the power supplied to each unit of the consumer facilities 4 as the grid power.

There is energy loss involved in operation of the fuel cell system 1. Cost of loss may appear as a difference between a sum of the electricity bill and the gas rate allocated to each unit and a sum of the electricity bill payable to a power company supplying the commercial power grid 31 and the gas rate payable to a gas company. The cost of loss may be, for example, equally borne by the units or allocated to the units in accordance with a ratio of the amount of gas used by each unit.

As described above, each unit of the consumer facilities 4 bears the gas rate in accordance with the amount of used water heating gas $a_q$ allocated thereto. To further simplify a charging method of the gas rate, the gas rate may be included in hot water rate. In this case, the hot water rate per unit volume is determined, and the hot water charge corresponding to the amount of the hot water supplied to each unit may be collected from each unit. The amounts of the hot water supplied to the units are measured by the flow meters 8b of FIG. 1. When the gas rate is included in the hot water rate, the hot water rate per unit volume may be changed according to the temperature of the water. This absorbs a fluctuation of the water heating gas using amount per unit volume due to seasonal changes in the temperature of the tap water poured into the hot water tank 22. More simply, for example, winter time (a cool season) and summer time (a warm season) may be determined for different hot water charges per unit volume.

Payments for the gas rates allocated to the units of the consumer facilities 4 may be directly collected by the gas company. An intermediate trader administrating the fuel cell system 1 may collect the payments for the gas rates and pass them to the gas company. When the units of the consumer facilities 4 bear the hot water rates, the intermediate trader may collect payments for the hot water rates. In this case, the intermediate trader pays, to the gas company, an amount corresponding to the gas rate out of the payments for the hot water collected. In this way, the intermediate trader administrating the fuel cell system 1 may set prices in a flexible manner.

Similarly to the gas rate, electricity bill payments for the power consumed by the units of the consumer facilities 4 may be directly collected by the power company. The intermediate trader administrating the fuel cell system 1 may collect the electricity bill payments and pass them to the power company. The same applies to the water rate.

The calculation of the amount of the fuel gas used by the consumer facilities 4 has been described above. According to this method, the amount of the used fuel gas may be appropriately allocated to each unit by calculating the amount of the fuel gas used by each unit. The method of calculating the amount of the used fuel gas according to the present embodiment may calculate the amount of the fuel gas used by each unit including the fuel gas used by the backup boiler 23. This method may appropriately calculate the amount of the used fuel gas even when heating water and actually supplying the heated water are performed at different timings.

Second Embodiment

A second embodiment will describe another method of calculating the amount of the used fuel gas to be allocated to the units. The method according to the second embodiment, to calculate the cost to be borne by each unit of the consumer facilities 4, uses the calorific values of the hot water flown back to the hot water tank 22 from the heat exchanger 211 measured by the calorimeter 6a coupled midway between the heat exchanger 211 and the hot water tank 22 of FIG. 1.

According to the present embodiment, some of the fuel gas supplied to the fuel cell 21 is used for the power generation. The rest of the fuel gas is used to heat water. It may be said that, in the fuel cell 21, the fuel gas is converted into energy. In this case, it may be said that some of the fuel gas is converted into the power and the rest into the calorific value of the hot water.

The calorimeter 6a may measure the calorific value given to the hot water by the heat exchanger 211. The calorific value given to the hot water corresponds to a portion of a calorific value generated from the power generation of the fuel cell 21. Heat transfer from the fuel cell 21 to the heat exchanger 211 takes time. According to the present embodiment, the calorific value measured by the calorimeter 6a is considered as corresponding to the power generated by the fuel cell 21 measured by the power meter 5a concurrently with the measurement of the calorific value. This enables calculation of a ratio of the amount of the power to the thermal energy supplied from the fuel cell 21. The gas used by the fuel cell 21 is separated into the gas used for power generation and the gas used to heat water, and the amount of the power generation gas used for power generation and the amount of used water heating gas may be separately calculated.

The amount of used water heating gas may be calculated by separating the amount of the gas supplied to the fuel cell 21 based on a ratio of the power (unit: W) measured by the power meter 5a to the calorific value per unit time (unit: J/sec=W) measured by the calorimeter 6a. The amount of used water heating gas may be calculated using a table indicating a relation between a value measured by the power meter 5a and a value measured by the calorimeter 6a. This further facilitates the calculation of the amount of used water heating gas. The amount of used water heating gas of the fuel cell system 1 in its entirety is calculated by adding the amount of gas used by the backup boiler 23 to the amount of used water heating gas of the fuel cell 21.

Figure 3:
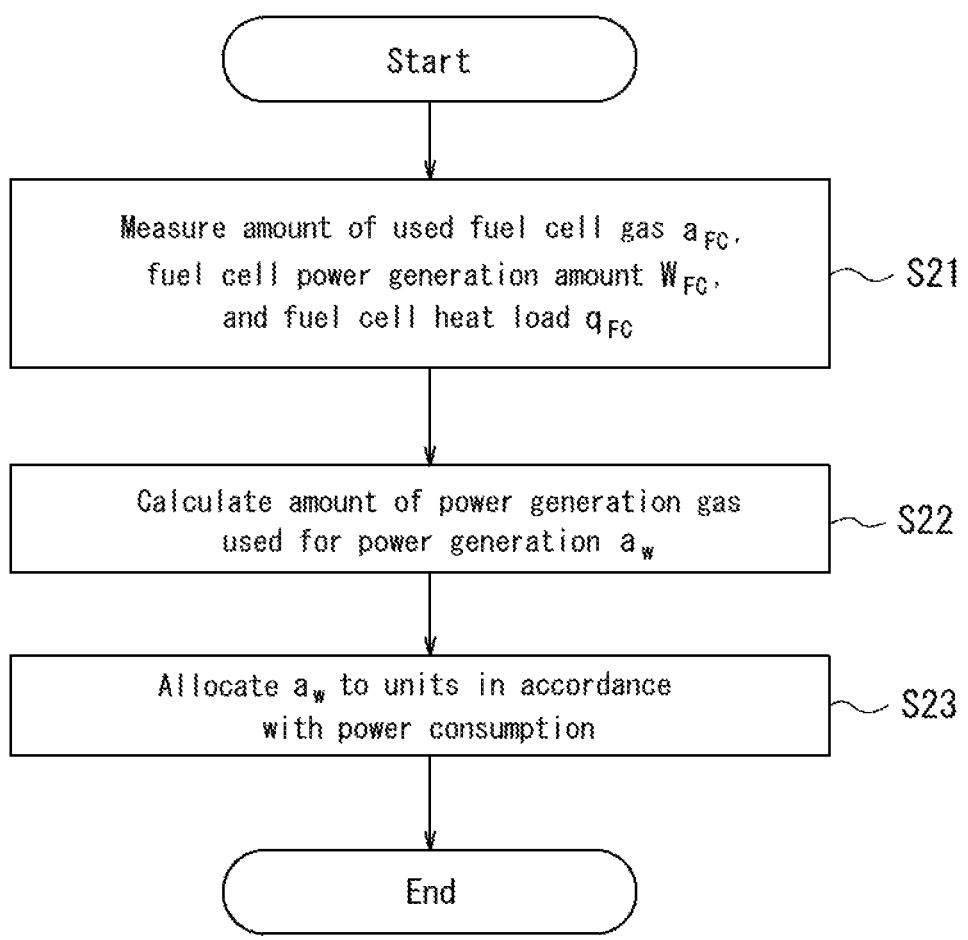
FIG. 3 is a flowchart illustrating a method of calculating an amount of a gas used for power generation.

The following is a description of a method of calculating the amount of the power generation gas used for power generation $a_w$ and allocating the cost to the units, with reference to FIG. 3. First, the controller 11 of the power control apparatus 10 obtains, from the gas meter 7a, the amount of used fuel cell gas $a_{FC}$ of the fuel cell 21. The controller 11 obtains, from the power meter 5a, the fuel cell power generation amount $W_{FC}$, i.e., the amount of the power generated by the fuel cell 21. The controller 11 obtains, from the calorimeter 6a, a fuel cell thermal dose $q_{FC}$ representing a calorific value given to the hot water flown back to the hot water tank 22 from the fuel cell 21 via the heat exchanger 211 (step S21).

Subsequently, the controller 11 calculates the amount of the power generation gas used for power generation $a_w$ from the following formula (1) (step S22):

$$a_w = \frac{W_{FC}}{W_{FC} + q_{FC}} \times a_{FC}. \quad (1)$$

The formula (1) indicates that the amount of the power generation gas used for power generation $a_w$ is calculated through proportional distribution of the amount of used fuel cell gas $a_{FC}$ on the basis of the amount of the power and thermal energy supplied from the fuel cell 21.

Then, the controller 11 allocates the amount of the power generation gas used for power generation $a_w$ thus calculated to each unit according to the power consumption of each unit (step S23). The controller 11 allocates the amount of the power generation gas used for power generation $a_w$ to each unit according to ratios of the power consumption of each unit. The amount of the power generation gas used for power generation $a_w$ may be allocated otherwise. The controller 11 may allocate the amount of the power generation gas used for power generation $a_w$ to the units in accordance with the contract between each unit and the power company or the intermediate trader administrating the fuel cell system 1.

Figure 4:
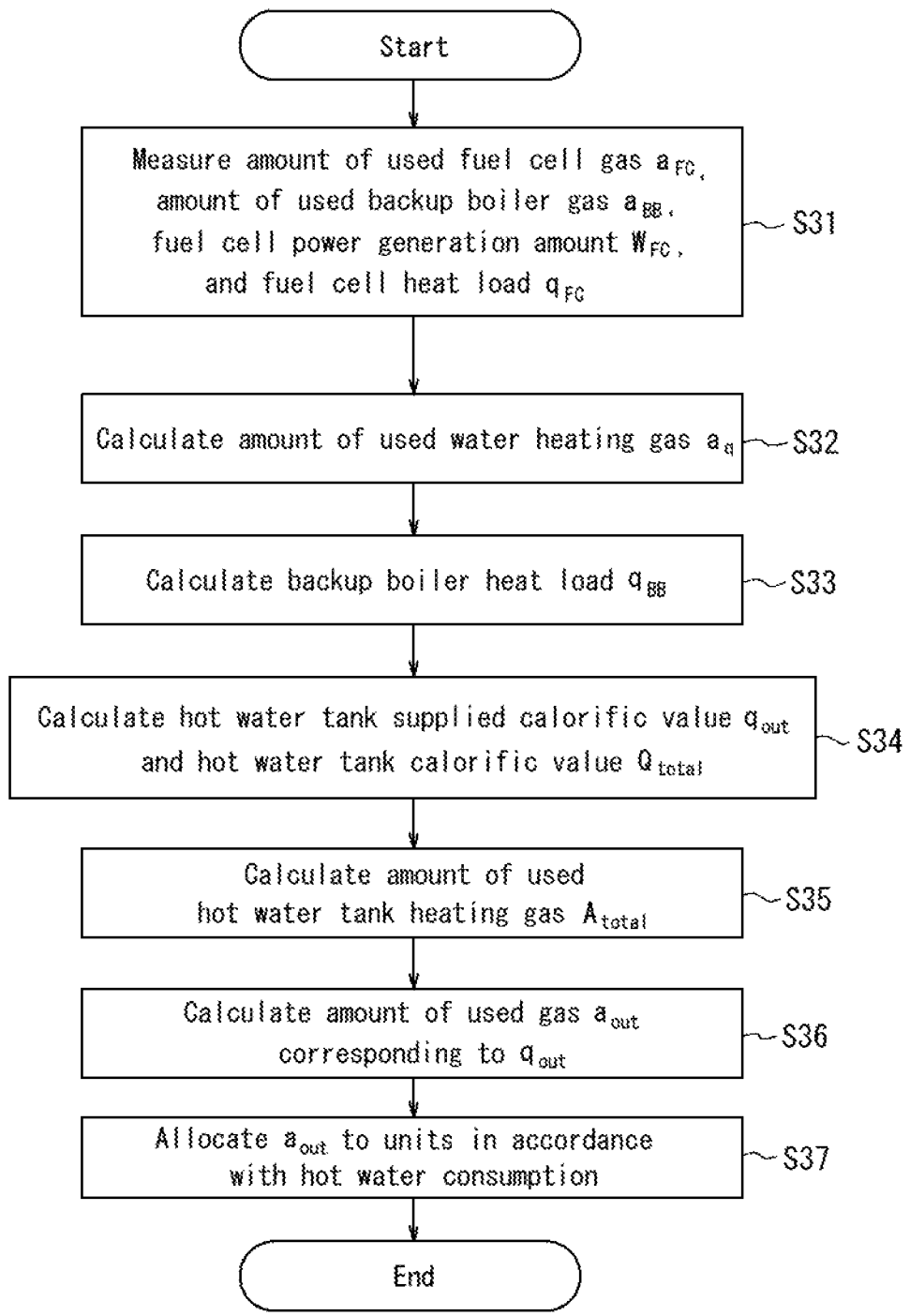
FIG. 4 is a flowchart illustrating a method of calculating an amount of the gas used for water heating.

The following is a description of a method of calculating the amount of used water heating gas $a_q$ and allocating the cost to each unit, with reference to FIG. 4. First, the controller 11 of the power control apparatus 10 obtains, from the gas meter 7b, the amount of used backup boiler gas $a_{BB}$ of the backup boiler 23. The controller 11, similarly to step S21 of FIG. 3, obtains the amount of used fuel cell gas $a_{FC}$, the fuel cell power generation amount $W_{FC}$, and the fuel cell thermal dose $q_{FC}$ (step S31).

Subsequently, the controller 11 calculates the amount of used water heating gas $a_q$ from the following formula (2) (step S32):

$$a_q = \frac{q_{FC}}{W_{FC} + q_{FC}} \times a_{FC}. \quad (2)$$

The formula (2) indicates that the amount of used water heating gas $a_q$ is calculated through proportional distribution of the amount of used fuel cell gas $a_{FC}$ on the basis of the amount of the power and the thermal energy supplied from the fuel cell 21. All values used for the calculation of the formula (2) are measured on a real-time basis. Therefore, the method according to the present embodiment may calculate, by using the formula (2), the amount of used water heating gas $a_q$ on the real-time basis.

Next, the controller 11 calculates backup boiler thermal dose $q_{BB}$, representing the calorific value given to the hot water by the backup boiler 23, from the following formula (3) (step S33):

$$q_{BB} = a_{BB} \times e_{BB} \quad (3)$$

In the formula (3), $e_{BB}$ is thermal conversion efficiency of the backup boiler 23 and represents the calorific value the backup boiler 23 may give to the hot water using the gas per unit volume.

Next, the controller 11 calculates hot water tank calorific value $Q_{total}$ stored in the hot water tank 22 from the following formulas (4) and (5) (step S34):

$$Q_{total}(t) = \sum_t \{q_{FC}(t) - q_{out}(t)\} + q_{BB} \quad (4)$$

$$q_{out} = q_1 + q_2 + \ldots + q_n. \quad (5)$$

In the formula (5), $q_{out}$ is a sum of calorific values $q_1$ to $q_n$ of the hot water supplied to the units. The first term of the right side of the formula (4) is the integration of a difference between the fuel cell thermal dose $q_{FC}$ representing calorific value entering the hot water tank 22 and the calorific value $q_{out}$ supplied to the units from the hot water tank 22 for a predetermined time period. The second term of the right side of formula (4) is the backup boiler thermal dose $q_{BB}$ given during reheating of the hot water in the hot water tank 22. The hot water tank calorific value $Q_{total}$ is a function of time t. The calorific values $q_1$ to $q_n$ of the hot water supplied to the units may be measured by, but not limited to, the calorimeters 6b-1 to 6b-n of FIG. 1, respectively. The calorific values $q_1$ to $q_n$ may be calculated from the flow rates measured by the flow meters 8b-1 to 8b-n and the temperature of the hot water measured by the thermometer 221.

Next, the controller 11 calculates an amount of used hot water tank heating gas $A_{total}$ used for heat storage of the hot water tank calorific value $Q_{total}$, from the following formulas (6) and (7) (step S35):

$$A_{total}(t) = \sum_t \{a_q(t) - a_{out}(t)\} + a_{BB} \quad (6)$$

$$a_{out} = a_1 + a_2 + \ldots + a_n. \quad (7)$$

In the formula (7), $a_{out}$ is a sum of the amounts of used gas $a_1$ to $a_n$ necessary to give the calorific values $q_1$ to $q_n$, respectively, of the hot water to be supplied to the units and corresponds to each term of the formula (5). The formula (6) corresponds to each term of the formula (4). The amount of used hot water tank heating gas $A_{total}$ of the formula (6) corresponds to the hot water tank calorific value $Q_{total}$ of the formula (4). Also, $a_q$, $a_{out}$, and $a_{BB}$ correspond to $q_{FC}$, $q_{out}$, and $q_{BB}$, respectively. $A_{total}$ is a function of the time t.

Next, the controller 11 calculates the amount of used gas $a_{out}$ corresponding to the calorific value $q_{out}$ outgoing from the hot water tank 22 from the following formula (8) (step S36):

$$a_{out} = \frac{A_{total}}{Q_{total}} \times q_{out}. \quad (8)$$

In the formula (8), $A_{total}/Q_{total}$ represents an amount of used gas necessary for unit calorific value stored in the hot water tank 22. The formula (8) indicates that, by taking the product of this value and $q_{out}$, the used gas amount $a_{out}$ used for billing the gas rate to the units may be calculated. On the right side of the formula (6), $a_{out}$ is a value corresponding to $q_{out}$ of the formula (4) as described above, and distinguished from $a_{out}$ calculated from the formula (8) for billing the gas rate to the units.

Next, the controller 11 allocates, to each unit, the amount of used gas $a_{out}$ calculated at step S36 in accordance with the ratio of the calorific value of the hot water supplied to each unit (equivalent to a ratio of the hot water consumed by each unit) (step S37). Then, the controller 11 ends process of the flowchart of FIG. 4.

Cost for the water used in the fuel cell system 1 or the cost for the loss involved in the operation of the fuel cell system 1 may be allocated similarly to the method according to the present embodiment.

The method according to the present embodiment has been described above. The method according to the present embodiment may calculate the amount of used water heating gas on the real-time basis. The method according to the present embodiment is capable of calculating more accurately by calculating the amount of used gas from the calorific value measured.

Third Embodiment

A third embodiment describes another method of calculating the amount of used fuel gas to be allocated to each unit. The method according to the third embodiment, to calculate the cost borne by each unit of the consumer facilities 4, uses a table indicating a relation between the power generation amount $W_{FC}$ of the fuel cell 21 measured by the power meter 5a and the power generation efficiency $e_w$ of the fuel cell 21.

According to the present embodiment, the amount of the power generated by the fuel cell 21 per unit volume of the gas used by the fuel cell 21, i.e., the power generation efficiency $e_w$ correlates to the fuel cell power generation amount $W_{FC}$ of the fuel cell 21. Based on the correlation between the power generation efficiency and the fuel cell power generation amount, the amount of the gas used for the power generation, i.e., the amount of the power generation gas used for power generation $a_w$ may be calculated. Further, based on the amount of the power generation gas used for power generation $a_w$, the amount of used water heating gas $a_q$ may be calculated.

Figure 5:
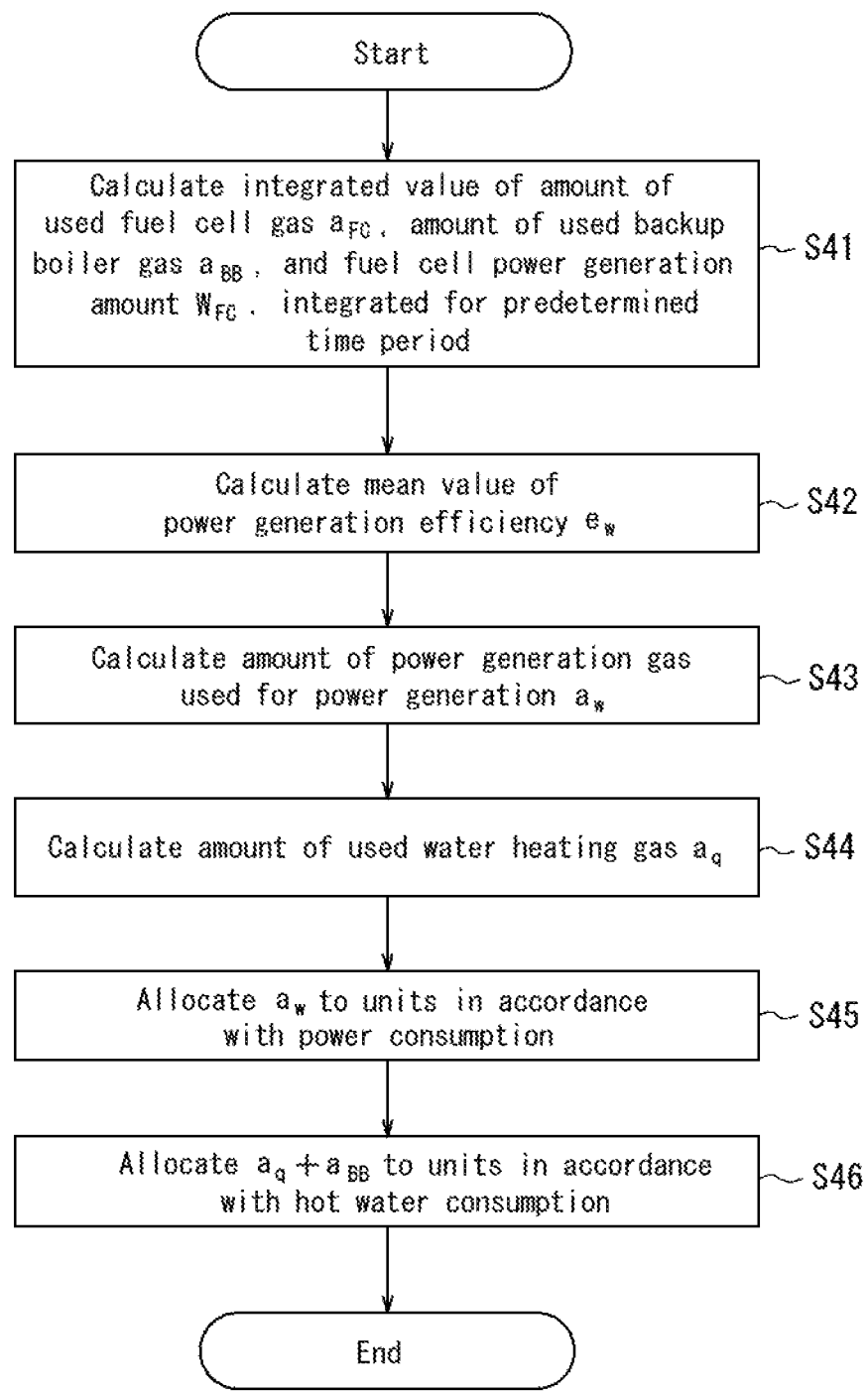
FIG. 5 is a flowchart illustrating a method of calculating the amount of the gas used for water heating from an amount of power generated by a fuel cell.

Referring now to FIG. 5, a method of calculating the amount of used water heating gas $a_q$ based on the fuel cell power generation amount $W_{FC}$ will be described. First, the controller 11 of the power control apparatus 10 obtains, from the gas meter 7a, the amount of used fuel cell gas $a_{FC}$ of the fuel cell 21. The controller 11 obtains, from the gas meter 7b, the amount of used backup boiler gas $a_{BB}$ of the backup boiler 23. The controller 11 obtains, from the power meter 5a, the fuel cell power generation amount $W_{FC}$ of the fuel cell 21. The controller 11 calculates an integrated value by integrating these values for a fixed time period (step S41). This time period may be, for example, in minutes, hours, days, or longer.

Subsequently, the controller 11 calculates a mean value of the power generation efficiency $e_w$ corresponding to the integrated value of the fuel cell power generation amount $W_{FC}$ calculated at step S41 (step S42). The power generation efficiency $e_w$ is an amount of generated power per unit volume of the gas used by the fuel cell 21. The mean value is calculated by dividing the integrated value by the integration time period. The controller 11 obtains a table preliminarily prepared and indicating the relation between the fuel cell power generation amount $W_{FC}$ and the power generation efficiency $e_w$. The table may be obtained from an external source, or preliminarily stored in the power control apparatus 10.

As illustrated in FIG. 6, the relation between the fuel cell power generation amount $W_{FC}$ and the power generation efficiency $e_w$ may be tabled. A fuel cell power generation amount $W_{FC1}$ corresponds to power generation efficiency $e_{w1}$. An example illustrated in FIG. 6 also indicates a relation with the amount of the power generation gas used for power generation $a_w$. In FIG. 6, a fuel cell power generation amount $W_{FC1}$ corresponds to an amount of a power generation gas used for power generation $a_{w1}$. The table illustrated in FIG. 6 by way of example also indicates relations with these values. For example, a fuel cell power generation amount $W_{FCm}$ corresponds to power generation efficiency $e_{wm}$ and an amount of a power generation gas used for power generation $a_{wm}$.

Next, the controller 11 calculates the amount of the power generation gas used for power generation $a_w$ (step S43). The controller 11 may calculate the amount of the power generation gas used for power generation $a_w$ from the following formula (9):

$$a_w = \frac{W_{FC}}{e_w}. \tag{9}$$

The formula (9) indicates a definition of the power generation efficiency $e_w$. The relation between the power generation efficiency $e_w$ and the amount of the power generation gas used for power generation $a_w$ illustrated in FIG. 6 by way of example is in compliance with the formula (9). When the relation is preliminarily indicated such as in the table illustrated in FIG. 6, the amount of the power generation gas used for power generation $a_w$ may be calculated without calculating the formula (9).

Next, the controller 11 calculates the amount of used water heating gas $a_q$ from the following formula (10) (step S44):

$$a_q = a_{FC} - a_w \tag{10}$$

The formula (10) assumes that the amount of used fuel cell gas $a_{FC}$ of the fuel cell 21 in its entirety may be separated into the amount of the power generation gas used for power generation $a_w$ and the amount of used water heating gas $a_q$.

Next, the controller 11 allocates the amount of the power generation gas used for power generation $a_w$ to each unit in accordance with the ratio of the power consumption of each unit (step S45).

Next, the controller 11 allocates the amount of used water heating gas $a_q$ and the amount of used backup boiler gas $a_{BB}$ to each unit in accordance with the ratio of the hot water consumption of each unit (step S46). Then, the controller 11 ends process of the flowchart of FIG. 5.

The cost of the water used in the fuel cell system 1 and the cost of loss involved in the operation of the fuel cell system 1 may be allocated similarly to the method according to the present embodiment.

The method according to the present embodiment has been described above. The method according to the present embodiment may omit the calorimeter 6a and thus simplify the system.

The first to third embodiments describe the fuel cell serving as an apparatus to generate power and heat water by using gas. However, such an apparatus to generate power and heat water by using gas is not limited to the fuel cell but may be an apparatus such as a gas-engine cogeneration apparatus.

Although the disclosure has been described based on the figures and the embodiments, it is to be understood that various modifications and changes may be implemented based on the disclosure by those who are ordinarily skilled in the art. Accordingly, such modifications and changes are included in the scope of the disclosure. For example, functions and the like included in each element or each step may be rearranged without logical inconsistency, so as to combine a plurality of elements or steps together or to separate them.

The control according to the disclosure is represented by a series of operations executed by a computer system or other hardware those are capable of executing a program instruction. The computer system or the other hardware include, for example, a general-purpose computer, a PC (personal computer), a special purpose computer, a workstation, or other programmable data processing apparatuses. Note that in each embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, an electronic device, and other apparatuses designed to be capable of executing the functions described herein, and/or a combination thereof. The embodiments presented herein are implemented by, for example, hardware, software, firmware, middleware, a microcode, or any combination thereof.

The network used herein includes, unless otherwise specified, the Internet, an ad-hoc network, LAN (Local Area Network), a cellular network, other networks, or any combination thereof.

The invention claimed is:

1. A power control apparatus comprising:
a controller configured to control a fuel cell configured to:
generate power and heat water using fuel gas; and
supply power and hot water to a plurality of consumer facilities,
wherein the controller:
receives, via a network, an amount of the fuel gas used by the fuel cell;
receives, via the network, an amount of the hot water supplied to the plurality of consumer facilities;
calculates, based on the amount of the fuel gas and the amount of the hot water, an amount of the fuel gas used by each one of the plurality of consumer facilities; and
allocates, based on the calculated amount of the fuel gas used by each of the plurality of consumer facilities, a portion of cost for the amount of the fuel gas used by the fuel cell to each of the plurality of consumer facilities.

2. The power control apparatus according to claim 1, wherein the controller further:
receives, via the network, a calorific value of the hot water heated by the fuel cell;
receives, via the network, an amount of the power generated by the fuel cell; and
calculates, based further on the calorific value of the hot water and the amount of the generated power, an amount of the fuel gas used by the plurality of consumer facilities.

3. The power control apparatus according to claim 1, wherein the controller further:
receives, via the network, an amount of the power generated by the fuel cell;
receives, via the network, a table indicating a relation between the amount of the generated power and an amount of power generation gas used for power generation of the fuel cell;
calculates the amount of the power generation gas used for power generation based on the amount of the generated power and the table; and
calculates, based further on the amount of the power generation gas used for power generation, an amount of the fuel gas used by the plurality of consumer facilities.

4. A fuel cell system comprising:
a fuel cell configured to generate power and heat water using fuel gas and to supply the power and hot water to a plurality of consumer facilities; and
the power control apparatus of claim 1.

5. The fuel cell system according to claim 4, wherein the controller further:
receives, via the network, a calorific value of the hot water heated by the fuel cell;
receives, via the network, an amount of the power generated by the fuel cell; and
calculates, based further on the calorific value of the hot water and the amount of the generated power, an amount of the fuel gas used by the plurality of consumer facilities.

6. The fuel cell system according to claim 4, wherein the controller further:
receives, via the network, an amount of the power generated by the fuel cell;
receives, via the network, a table indicating a relation between the amount of the generated power and an amount of power generation gas used for power generation of the fuel cell;
calculates the amount of the power generation gas used for power generation based on the amount of the generated power and the table; and
calculates, based further on the amount of the power generation gas used for power generation, an amount of the fuel gas used by the plurality of consumer facilities.

* * * * *